United States Patent
Hong et al.

(10) Patent No.: US 11,909,303 B2
(45) Date of Patent: Feb. 20, 2024

(54) BYPASS DEVICE AND METHOD OF HVDC SUB MODULE

(71) Applicant: HYOSUNG HEAVY INDUSTRIES CORPORATION, Seoul (KR)

(72) Inventors: Jung Ki Hong, Incheon (KR); Dong Woo Seo, Anyang-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 158 days.

(21) Appl. No.: 17/623,133

(22) PCT Filed: May 11, 2021

(86) PCT No.: PCT/KR2021/005849
§ 371 (c)(1),
(2) Date: Dec. 27, 2021

(87) PCT Pub. No.: WO2021/230606
PCT Pub. Date: Nov. 18, 2021

(65) Prior Publication Data
US 2022/0231594 A1   Jul. 21, 2022

(30) Foreign Application Priority Data
May 14, 2020   (KR) .................... 10-2020-0057749

(51) Int. Cl.
*H02M 1/32* (2007.01)
*H02M 1/08* (2006.01)

(52) U.S. Cl.
CPC ............... *H02M 1/08* (2013.01); *H02M 1/32* (2013.01)

(58) Field of Classification Search
CPC .......... H02M 1/08; H02M 1/32; H02M 1/325; H02M 7/4835; H02M 7/483
See application file for complete search history.

(56) References Cited

U.S. PATENT DOCUMENTS

| | | | |
|---|---|---|---|
| 10,734,804 B2* | 8/2020 | Aramaki | .................... H02J 1/00 |
| 2017/0163170 A1* | 6/2017 | Tahata | ................. H02M 7/4835 |
| 2017/0288569 A1* | 10/2017 | Uda | ....................... H02M 7/537 |
| 2018/0006548 A1 | 1/2018 | Santi | |
| 2020/0122582 A1* | 4/2020 | Curuvija | ................. B60L 50/40 |
| 2020/0153348 A1* | 5/2020 | Woodley | ................. H02M 1/32 |

FOREIGN PATENT DOCUMENTS

| | | |
|---|---|---|
| JP | 6208803 B2 | 10/2017 |
| KR | 10-2016-0091875 A | 8/2016 |
| KR | 10-2018-0075340 A | 7/2018 |
| KR | 10-2018-0111333 A | 10/2018 |
| KR | 10-2019-0080621 A | 7/2019 |

* cited by examiner

*Primary Examiner* — Sibin Chen
(74) *Attorney, Agent, or Firm* — NKL Law; Jae Youn Kim

(57) ABSTRACT

A bypass device of an HVDC sub module according to the present invention comprises: a sub module for generating a voltage in an HVDC system; a bypass switch driving unit for driving a bypass switch located at an input terminal of the sub module; a sub module controller for monitoring a state of the sub module to transmit the monitored state to a system controller, and controlling the sub module and the bypass switch driving unit according to a command of the system controller; and a voltage monitoring unit for controlling the bypass switch driving unit by monitoring a voltage of a capacitor located in the sub module.

10 Claims, 5 Drawing Sheets

BYPASS DEVICE AND METHOD OF HVDC SUB MODULE

TECHNICAL FIELD

The present invention relates to a device and a method for bypassing a high voltage direct current (HVDC) sub-module, and more particularly, to a bypass function of protecting a capacitor positioned in an HVDC sub-module. That is, the present invention relates to a device and a method for bypassing an HVDC sub-module, which are capable of stably operating an HVDC system by duplicating a bypass circuit of an HVDC sub-module.

BACKGROUND ART

Recently, there has been an increasing interest in a method of linking a power grid by converting alternating current (AC) power into direct current (DC) power rather than a method of directly linking an AC power system in order to link a power grid.

A high voltage direct current (HVDC) system is a system that converts AC power generated in a power plant into DC power, transmits the DC power to a required site, and then reconverts the DC power into AC power to supply the AC power to consumers. Recently, an HVDC system has been developed by constituting a plurality of modular converters in which a plurality of small-capacity sub-modules are connected in series.

In this case, a capacitor used in a DC link unit in the HVDC system is mainly used for linking and smoothing a voltage of DC energy and for buffering charge/discharge energy. However, when an accident such as electrolyte ejection due to performance degradation or temperature rise occurs, an increase in use of such a capacitor may cause a very dangerous situation leading to a short circuit accident in an HVDC system, and thus, research on a failure diagnosis system therefor has been continued.

As an example, Korean Patent Publication No. 10-2019-0065675 discloses "Apparatus and method for estimating capacitor capacity of HVDC system having modular multi-level converter," which analyzes a change in capacitor capacity for each sub-module based on data about each sub-module.

However, even in this case, when a failure occurs in a circuit controlling a capacitor of the sub-module, the disconnection of the HVDC system may be caused.

DISCLOSURE

Technical Problem

The present invention is directed to providing a device and a method for bypassing a high voltage direct current (HVDC) sub-module, in which, even when a failure occurs in a sub-module controller in an HVDC sub-module, an additional device, which detects a voltage of a capacitor voltage in the sub-module to perform bypass, is used, thereby protecting a capacitor in the sub-module.

The present invention is also directed to providing a device and a method for bypassing an HVDC sub-module, in which a function of bypassing an HVDC sub-module is stably performed by duplicating a driving unit of a device for bypassing an HVDC sub-module, thereby preventing an HVDC system from being disconnected due to a failure of the HVDC sub-module.

Technical Solution

According to one embodiment of the present invention, a device for bypassing a high voltage direct current (HVDC) sub-module includes a sub-module configured to generate a voltage in an HVDC system, a bypass switch driving unit configured to drive a bypass switch positioned at an input of the sub-module, a sub-module controller configured to monitor a state of the sub-module to transmit the monitored state to a system controller and control the sub-module and the bypass switch driving unit according to a command of the system controller, and a voltage monitoring unit configured to monitor a voltage of a capacitor positioned in the sub-module and control the bypass switch driving unit.

The sub-module may include the capacitor configured to store and release energy, an insulated gate bipolar transistor1 (IGBT1) and a first diode which are positioned between a P input of the sub-module and a positive terminal of the capacitor, and an insulated gate bipolar transistor2 (IGBT2) and a second diode which are positioned between the P input and a negative terminal of the capacitor connected to an N input of the sub-module.

The bypass switch may be connected between the P input and the N input of the sub-module and may bypass the P input and the N input under control of the bypass switch driving unit.

The sub-module controller may control both the IGBT1 and the IGBT2 to be turned off to allow input energy of the sub-module to be stored in the capacitor through the first diode in a section in which a P input voltage of the sub-module is higher than an N input voltage thereof.

The sub-module controller may control the IGBT1 to be turned on and control the IGBT2 to be turned off to allow energy charged in the capacitor to be released to an input of the sub-module in a section in which a P input voltage of the sub-module is lower than an N input voltage thereof.

The sub-module controller may control the IGBT1 to be turned off and control the IGBT2 to be turned on to bypass the P input and the N input of the sub-module.

When the voltage of the capacitor exceeds a bypass switch-on voltage by the sub-module controller positioned between an operating voltage and a capacitor limit voltage, the sub-module controller may control the bypass switch driving unit to perform bypass at the input of the sub-module.

When the voltage of the capacitor exceeds a bypass switch-on voltage by the voltage monitoring unit positioned between the bypass switch-on voltage by the sub-module controller and the capacitor limit voltage, the voltage monitoring unit may control the bypass switch driving unit to perform bypass at the input of the sub-module.

According to another embodiment of the present invention, a method of bypassing an HVDC sub-module includes a system controller command receiving operation of receiving, by a sub-module controller, a control command from a system controller, an energy storage operation of, when the control command indicates energy storage, controlling, by the sub-module controller, an insulated gate bipolar transistor1 (IGBT1) and an insulated gate bipolar transistor2 (IGBT2) of a sub-module to construct a path through which energy is storable in a capacitor in the sub-module, an energy release operation of, when the control command indicates energy release, controlling, by the sub-module controller, the IGBT1 and the IGBT2 of the sub-module to construct a path through which energy of the capacitor in the sub-module is releasable, a bypass operation of, when the control command indicates bypass, controlling, by the submodule controller, the IGBT1 and the IGBT2 of the sub-module to block a path with the capacitor in the sub-module and construct a bypass path, a capacitor voltage transmitting operation of, when it is checked whether a voltage of the capacitor in the sub-module is greater than a bypass switch-on voltage by the sub-module controller, and the voltage of the capacitor is less than the bypass switch-on voltage (V830) by the sub-module controller, transmitting the voltage of the capacitor to the system controller, a bypass switch driving unit turning-on operation of, when the voltage of the capacitor in the sub-module is greater than the bypass switch-on voltage by the sub-module controller, comparing the voltage of the capacitor in the sub-module with a bypass switch-on voltage by a voltage monitoring unit and, when the voltage of the capacitor is greater than the bypass switch-on voltage by the voltage monitoring unit, turning a bypass switch driving unit on, and a bypass switch turning-on operation of turning, by the bypass switch driving unit, a bypass switch on.

In the energy storage operation, the sub-module controller may control both the IGBT1 and the IGBT2 to be turned off to allow input energy of the sub-module to be stored in the capacitor through a first diode in a section in which a P input voltage of the sub-module is higher than an N input voltage thereof.

In the energy release operation, the sub-module controller may control the IGBT1 to be turned on and control the IGBT2 to be turned off to allow energy charged in the capacitor to be released to an input of the sub-module in a section in which a P input voltage of the sub-module is lower than an N input voltage thereof.

In the bypass operation, the sub-module controller may control the IGBT1 to be turned off and control the IGBT2 to be turned on to bypass a P input and an N input of the sub-module.

The bypass switch-on voltage by the voltage monitoring unit may be positioned between the bypass switch-on voltage by the sub-module controller and the capacitor limit voltage.

Advantageous Effects

In a device and a method for bypassing a high voltage direct current (HVDC) sub-module according to the present invention, even when a failure occurs in a sub-module controller in an HVDC sub-module, an additional device, which detects a voltage of a capacitor voltage in the sub-module to perform bypass, is used, thereby protecting a capacitor in the sub-module.

In addition, in a device and a method for bypassing an HVDC sub-module according to the present invention, a function of bypassing the HVDC sub-module can be stably performed by duplicating a driving unit of the device for bypassing an HVDC sub-module, thereby preventing an HVDC system from being disconnected due to a failure of the HVDC sub-module.

MODES OF THE INVENTION

Figure 1:
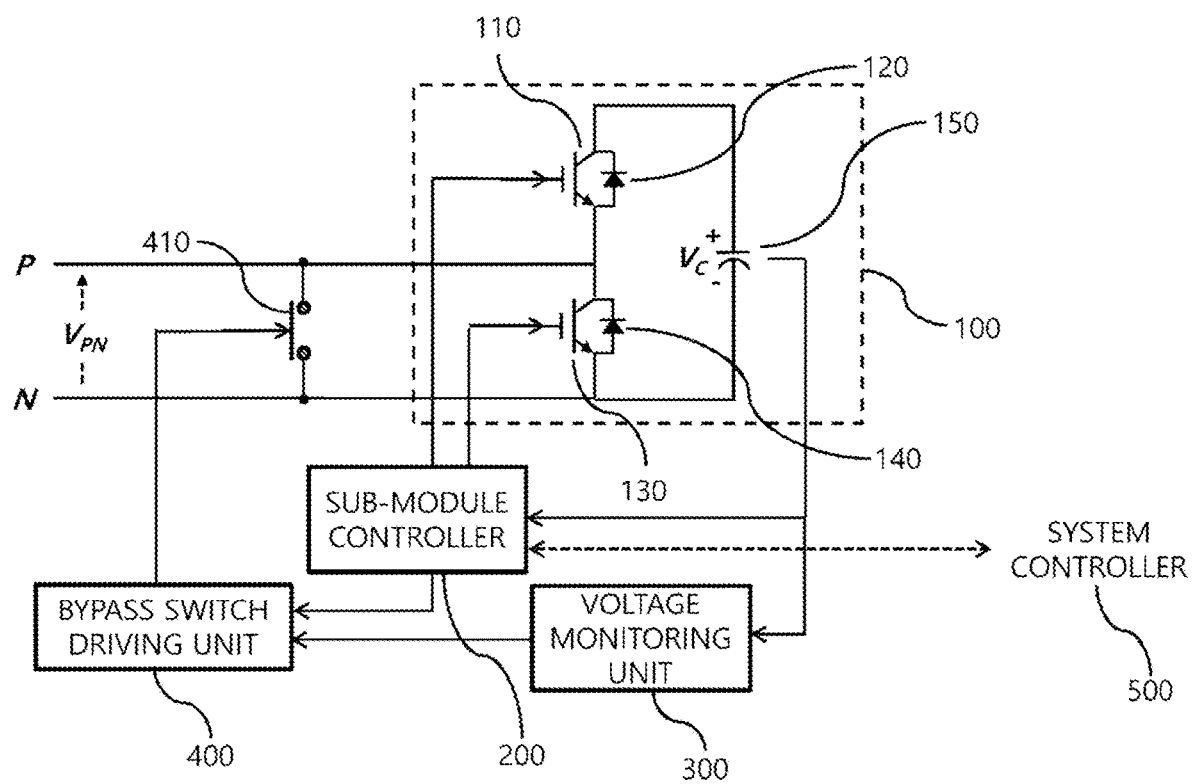
FIG. 1 is a block diagram illustrating a device for bypassing a high voltage direct current (HVDC) sub-module according to one embodiment of the present invention.

Detailed embodiments for implementing the present invention will be described with reference to the accompanying drawings.

The present invention may be modified in various ways and implemented by various embodiments so that specific embodiments are illustrated in the drawings and will be described in detail below. However, it is to be understood that the present invention is not limited to the specific embodiments but includes all modifications, equivalents, and substitutions included in the spirit and the scope of the present invention.

Hereinafter, a device and a method for bypassing a high voltage direct current (HVDC) sub-module according to the present invention will be described with reference to the accompanying drawings.

FIG. 1 is a block diagram illustrating a device for bypassing an HVDC sub-module according to one embodiment of the present invention, and FIGS. 2 to 7 are detailed circuit diagrams and a graph for describing FIG. 1 in detail.

Hereinafter, the device for bypassing an HVDC sub-module according to one embodiment of the present invention will be described with reference to FIGS. 1 to 7.

First, referring to FIG. 1, the device for bypassing an HVDC sub-module according to one embodiment of the present invention includes a sub-module which generates a voltage in an HVDC system, a bypass switch driving unit 400 which drives a bypass switch 410 positioned at an input of the sub-module, a sub-module controller 200 which monitors a state of the sub-module to transmit the monitored state to a system controller 500 and controls the sub-module and the bypass switch driving unit 400 according to a command of the system controller 500, and a voltage monitoring unit 300 which monitors a voltage of a capacitor 150 positioned in the sub-module and controls the bypass switch driving unit 400.

Here, the sub-module may include the capacitor 150 which stores and releases energy, an insulated gate bipolar transistor1 (IGBT1) 110 and a first diode 120 which are positioned between a P input of the sub-module and a positive terminal of the capacitor 150, and an insulated gate bipolar transistor2 (IGBT2) 130 and a second diode 140 which are positioned between the P input and a negative terminal of the capacitor 150 connected to an N input of the sub-module.

That is, the sub-module controller 200 transmits a voltage of the capacitor 150 to the system controller 500 and receives an operation command of the sub-module from the system controller 500. In this case, the sub-module controller 200 receives the control command from the system controller 500 and checks whether the control command indicates energy storage, energy release, or bypass.

In this case, when it is checked that the control command indicates the energy storage, the sub-module controller 200 controls the IGBT1 110 and the IGBT2 130 to store energy in the capacitor 150, when it is checked that the control command indicates the energy release, the sub-module controller 200 controls the IGBT1 110 and IGBT2 130 to release energy stored in the capacitor 150, and when it is checked that the control command indicates the bypass, the sub-module controller 200 controls the IGBT1 110 and IGBT2 130 to bypass an input thereof.

Meanwhile, when a voltage of the capacitor 150 is greater than or equal to a certain voltage, the sub-module controller 200 may control the bypass switch driving unit 400 to perform bypass through the bypass switch 410 at the input of the sub-module, and when bypass is not performed due to malfunction of the sub-module controller 200, the voltage monitoring unit 300 controls the bypass switch driving unit 400 to perform bypass through the bypass switch 410 positioned at the input of the sub-module.

Thus, even when the sub-module controller 200 fails, the capacitor 150 can be protected by the voltage monitoring unit 300, and a function of bypassing the HVDC sub-module can be stably performed by duplicating protection of the capacitor 150, thereby preventing the HVDC system from being disconnected due to a failure of the HVDC sub-module.

Figure 2:
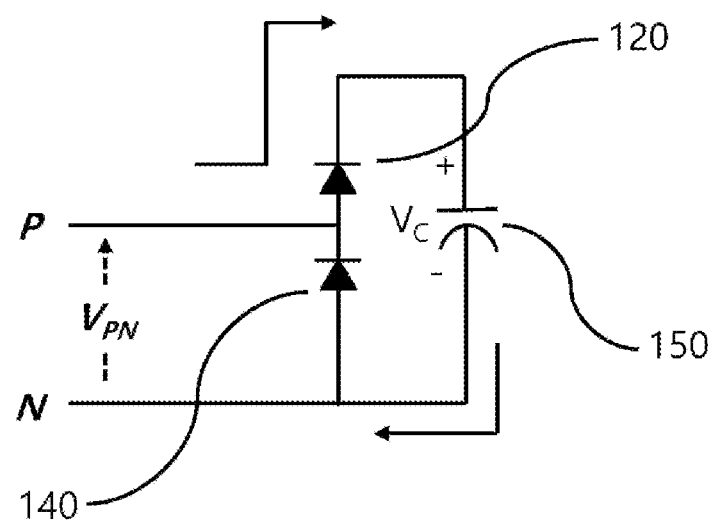
FIG. 2 is a simplified circuit diagram illustrating an operation in which the sub-module of FIG. 1 performs an energy storage function under insulated gate bipolar transistor (IGBT) control.

FIG. 2 is a simplified circuit diagram illustrating an operation in which the sub-module of FIG. 1 performs an energy storage function under IGBT control.

As can be seen in FIG. 2, the sub-module controller 200 controls both the IGBT1 110 and the IGBT2 130 to be turned off, thereby allowing input energy of the sub-module to be stored in the capacitor 150 through the first diode 120 in a section in which a P input voltage of the sub-module is higher than an N input voltage thereof.

Here, a current introduced from the P input does not flow directly to the N input by the second diode 140 because the IGBT2 130 is turned off but may be stored in the capacitor 150 through the first diode 120 because the IGBT1 110 is turned off.

Accordingly, whether to store energy in the capacitor 150 can be simply controlled only by controlling the IGBT1 110 and the IGBT2 130.

Figure 3:
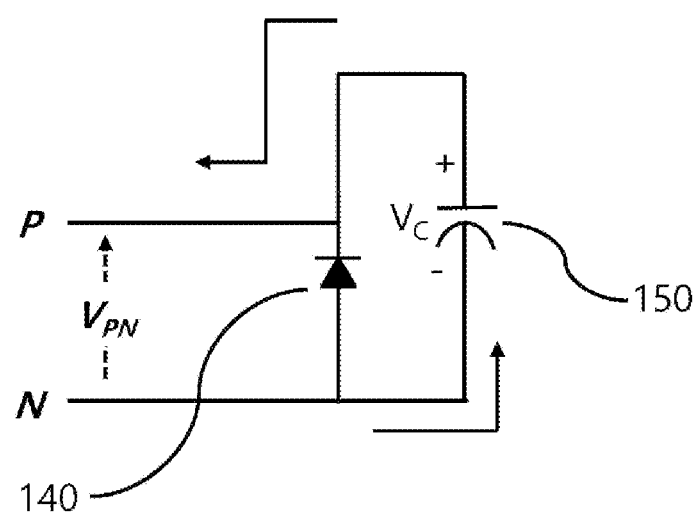
FIG. 3 is a simplified circuit diagram illustrating an operation in which the sub-module of FIG. 1 performs an energy release function under IGBT control.

FIG. 3 is a simplified circuit diagram illustrating an operation in which the sub-module of FIG. 1 performs an energy release function under IGBT control.

As can be seen in FIG. 3, the sub-module controller 200 controls the IGBT1 110 to be turned on and controls the IGBT2 130 to be turned off, thereby allowing energy charged in the capacitor 150 to be released to an input of the sub-module in a section in which a P input voltage of the sub-module is lower than an N input voltage thereof.

Here, a current introduced from the N input may flow directly to the P input by the second diode 140 because the IGBT2 130 is turned off, but energy of the capacitor 150 may be released to the P input because a voltage of the capacitor 150 is higher than a voltage of the N input. In this case, since the IGBT1 110 is turned on, the voltage of the capacitor 150 may be released directly to the P input without the influence of the first diode 120.

Accordingly, whether to release energy of the capacitor 150 can be simply controlled only by controlling the IGBT1 110 and the IGBT2 130.

Figure 4:
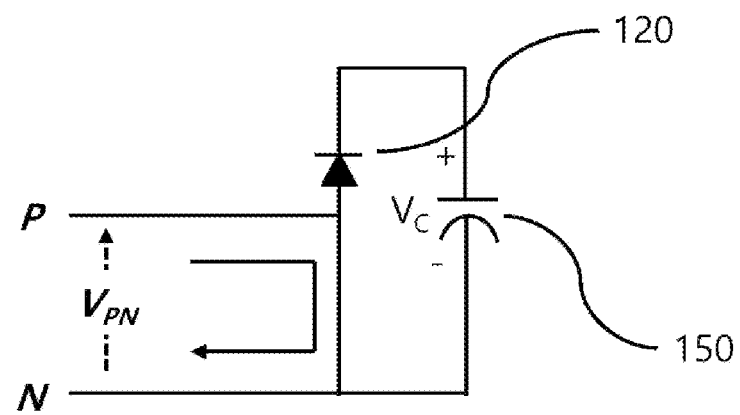
FIG. 4 is a simplified circuit diagram illustrating a bypass operation under IGBT control in the sub-module of FIG. 1 in a section in which a P input voltage is higher than an N input voltage.

FIG. 4 is a simplified circuit diagram illustrating a bypass operation under IGBT control in the sub-module of FIG. 1 in a section in which a P input voltage is higher than an N input voltage.

As can be seen in FIG. 4, in the section in which the P input voltage of the sub-module is higher than the N input voltage thereof, the sub-module controller 200 controls the IGBT1 110 to be turned off and controls the IGBT2 130 to be turned on, thereby allowing a P input current to be bypassed to an N input.

Here, a current introduced from the P input may flow directly to the N input because the IGBT2 130 is turned on, and thus, the voltage of the capacitor 150 may be prevented from being released to the P input by the first diode 120.

Accordingly, only by controlling the IGBT1 110 and IGBT2 130, storage may not be performed in a storage section of the sub-module, and bypass may be simply performed without release of energy of the capacitor 150.

Figure 5:
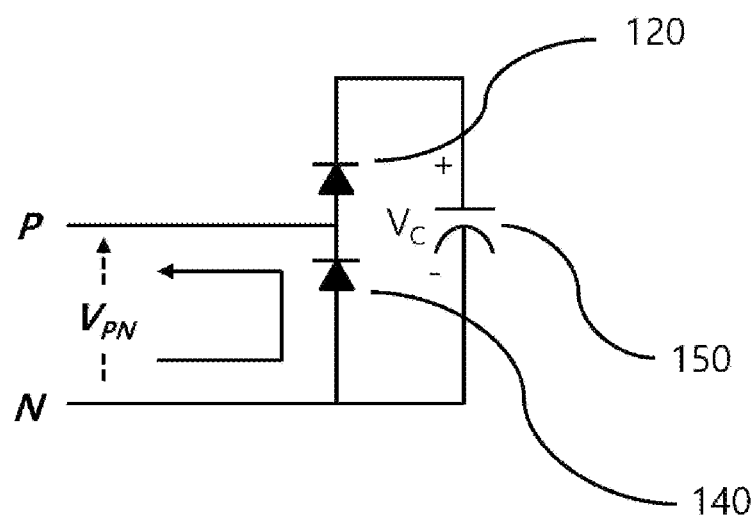
FIG. 5 is a simplified circuit diagram illustrating a bypass operation under IGBT control in the sub-module of FIG. 1 in a section in which a P input voltage is lower than an N input voltage.

FIG. 5 is a simplified circuit diagram illustrating a bypass operation under IGBT control in the sub-module of FIG. 1 in a section in which a P input voltage is lower than an N input voltage.

As can be seen in FIG. 5, in the section in which the P input voltage of the sub-module is lower than the N input voltage thereof, the sub-module controller 200 controls all of the IGBT1 110 and the IGBT2 130 to be turned off or controls the IGBT1 110 to be turned off and controls the IGBT2 130 to be turned on, thereby allowing an N input current to be bypassed to a P input.

Here, a current introduced from the N input may flow directly to the P input through the second diode 140 because the IGBT2 130 is turned off, and thus, the voltage of the capacitor 150 may be prevented from being released to the P input by the first diode 120.

Accordingly, only by controlling the IGBT1 110 and IGBT2 130, release may not be performed in a release section of the sub-module, and bypass may be simply performed without release of energy of the capacitor 150.

Figure 6:
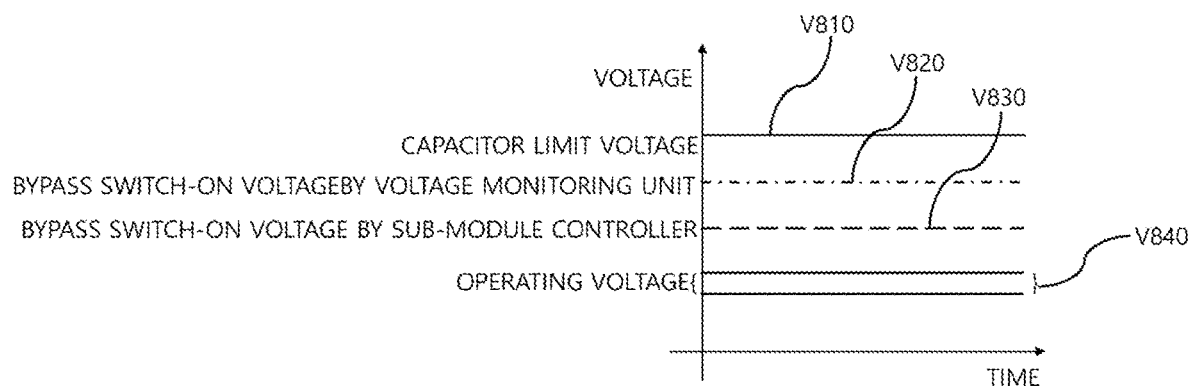
FIG. 6 is a graph showing a comparison between various voltages for controlling an operation state of the sub-module by monitoring a voltage of a capacitor of FIG. 1.

FIG. 6 is a graph showing a comparison between various voltages for controlling an operation state of the sub-module by monitoring a voltage of the capacitor 150 of FIG. 1.

As can be seen in FIG. 6, when a voltage of the capacitor 150 exceeds a bypass switch-on voltage V830 by the sub-module controller positioned between an operating voltage V840 and a capacitor limit voltage V810, the sub-module controller 200 may control the bypass switch driving unit 400 to perform bypass at the input of the sub-module.

In addition, in a case in which bypass is not performed due to an error even when the voltage of the capacitor 150 exceeds the bypass switch-on voltage V830 by the sub-module controller positioned between the bypass switch-on voltage V830 by the sub-module controller and the capacitor limit voltage V810, when the voltage of the capacitor 150 exceeds a bypass switch-on voltage V820 by the voltage monitoring unit, the voltage monitoring unit 300 controls the bypass switch driving unit 400 to perform bypass at the input of the sub-module.

The bypass switch-on voltage V820 by the voltage monitoring unit may be set to be positioned between the bypass switch-on voltage V830 by the sub-module controller and the capacitor limit voltage V810.

That is, even when the sub-module controller 200, which primarily performs bypass, operates abnormally, the voltage monitoring unit 300 can detect the voltage of the capacitor 150 to perform bypass so that a function of bypassing the HVDC sub-module can be stably performed to prevent the HVDC system from being disconnected due to a failure of the HVDC sub-module.

Figure 7:
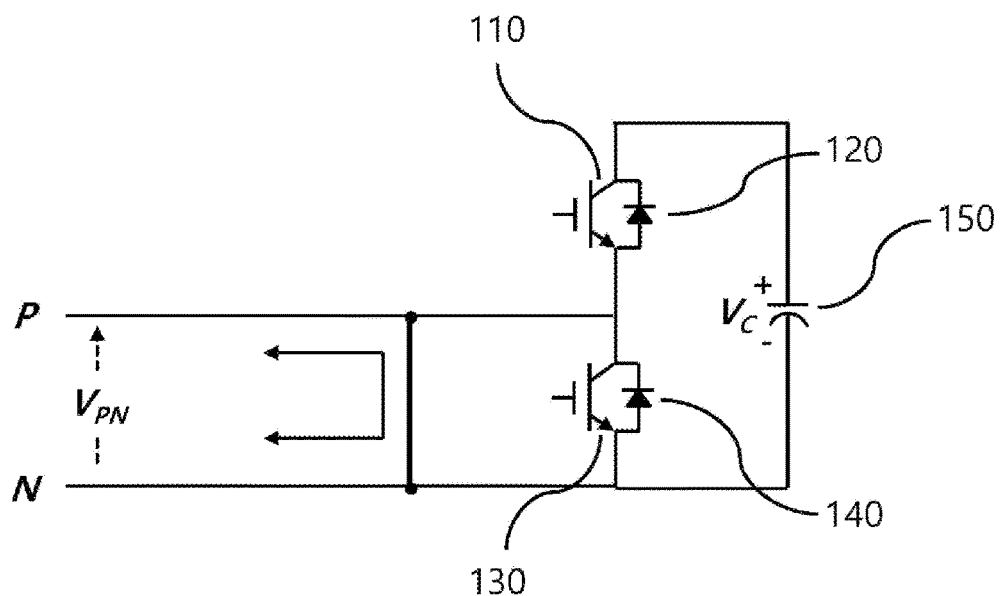
FIG. 7 is a simplified circuit diagram illustrating an operation in which bypass is performed under bypass switch control in the sub-module of FIG. 1.

FIG. 7 is a simplified circuit diagram illustrating an operation in which bypass is performed under bypass switch control in the sub-module of FIG. 1.

As can be seen in FIG. 7, the bypass switch 410 may be connected between a P input and an N input of the sub-module, and thus, under control of the bypass switch driving unit 400, the P input and the N input may be bypassed.

Thus, the capacitor 150 is prevented from being overcharged, and a function of bypassing the sub-module is stably performed when the sub-module fails, thereby preventing the HVDC system from being disconnected due to a failure of the HVDC sub-module.

Figure 8:
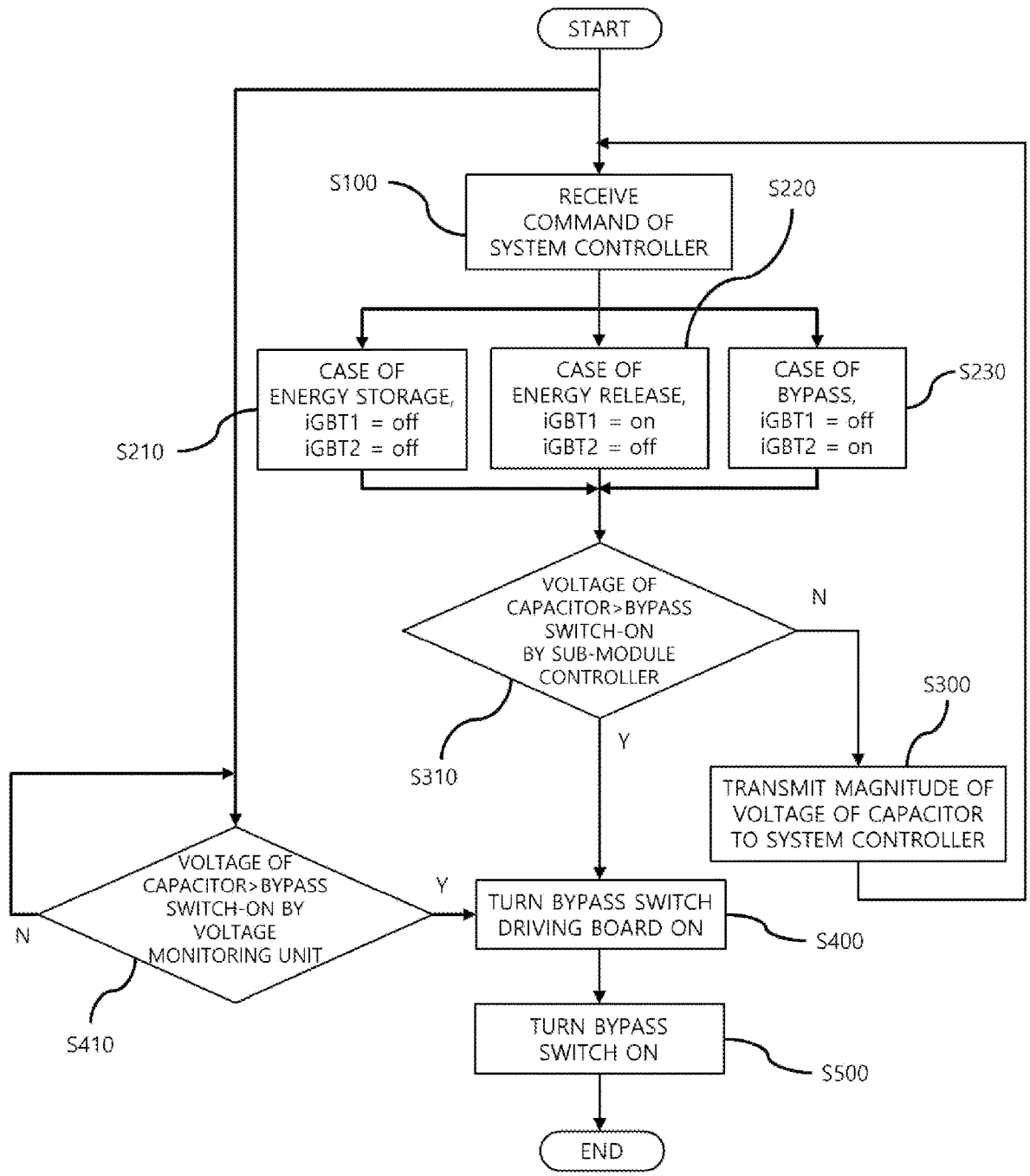
FIG. 8 is a flowchart illustrating a method of bypassing an HVDC sub-module according to one embodiment of the present invention.

FIG. 8 is a flowchart illustrating a method of bypassing an HVDC sub-module according to one embodiment of the present invention.

As can be seen in FIG. 8, the method of bypassing an HVDC sub-module according to the present invention includes receiving, by a sub-module controller 200, a control command of a sub-module from a system controller 500 (S100), controlling, by the sub-module controller 200, an IGBT1 110 and an IGBT2 130 of the sub-module to construct a path through which energy is storable in a capacitor 150 in the sub-module when the control command indicates energy storage (S210), controlling, by the sub-module controller 200, the IGBT1 110 and the IGBT2 130 of the sub-module to construct a path through which energy of the capacitor 150 in the sub-module is releasable when the control command indicates energy release (S220), controlling, by the sub-module controller 200, the IGBT1 110 and the IGBT2 130 of the sub-module to block a path with the capacitor 150 in the sub-module and construct a bypass path when the control command indicates bypass (S230), transmitting the voltage of the capacitor 150 to the system controller 500 when it is checked whether a voltage of the capacitor 150 in the sub-module is greater than a bypass switch-on voltage V830 by the sub-module controller (S310) and the voltage of the capacitor 150 is less than the bypass switch-on voltage V830 by the sub-module controller (S300), comparing the voltage of the capacitor 150 in the sub-module with a bypass switch-on voltage V820 by a voltage monitoring unit when the voltage of the capacitor 150 in the sub-module is greater than the bypass switch-on voltage (V830) by the sub-module controller (S410), and turning a bypass switch driving unit 400 on when the voltage of the capacitor 150 is greater than the bypass switch-on voltage V820 by the voltage monitoring unit (S400), and turning, by the bypass switch driving unit 400, a bypass switch 410 on (S500).

In this case, in energy storage operation S210, the sub-module controller 200 may control both the IGBT1 110 and the IGBT2 130 to be turned off, thereby allowing input energy of the sub-module to be stored in the capacitor 150 through a first diode 120 in a section in which a P input voltage of the sub-module is higher than an N input voltage thereof.

In addition, in energy release operation S220, the sub-module controller 200 controls the IGBT1 110 to be turned on and controls the IGBT2 130 to be turned off, thereby allowing energy charged in the capacitor 150 to be released to an input of the sub-module in a section in which the P input voltage of the sub-module is lower than the N input voltage thereof.

In addition, in bypass operation S230, the sub-module controller 200 controls the IGBT1 110 to be turned off and controls the IGBT2 130 to be turned on, thereby allowing a P input and an N input to be bypassed.

Here, the bypass switch-on voltage V820 by the voltage monitoring unit may be positioned between the bypass switch-on voltage V830 by the sub-module controller and a capacitor limit voltage V810.

According to the method of bypassing an HVDC sub-module of the present invention as described above, when a voltage of the capacitor 150 is greater than or equal to a certain voltage, the sub-module controller 200 may control the bypass switch driving unit 400 to perform bypass through the bypass switch 410 at an input of the sub-module, and even when bypass is not performed due to malfunction of the sub-module controller 200, the voltage monitoring unit 300 controls the bypass switch driving unit 400 to perform bypass through the bypass switch 410 positioned at the input of the sub-module.

As described above, in a device and a method for bypassing an HVDC sub-module according to the present invention, even when a failure occurs in a sub-module controller in an HVDC sub-module, an additional device, which detects a voltage of a capacitor voltage in the sub-module to perform bypass, is used, thereby protecting a capacitor in the sub-module. In addition, a function of bypassing the HVDC sub-module can be stably performed by duplicating a driving unit of the device for bypassing an HVDC sub-module, thereby preventing an HVDC system from being disconnected due to a failure of the HVDC sub-module.

What has been described above includes examples of one or more embodiments. Of course, it is not possible to describe all possible combinations of components or methods for the purpose of describing the above-described embodiments but it can be perceived that those skilled in the art may make many additions and replacements of various embodiments. Accordingly, the described embodiments include all alternatives, modifications, and changes without departing from the spirit and scope of the present invention as defined in the following claims.

INDUSTRIAL AVAILABILITY

The present invention relates to a device and a method for bypassing an HVDC submodule and is available in an HVDC field.

The invention claimed is:

1. A device for bypassing a sub-module in a high voltage direct current (HVDC) system, the device comprising:
the sub-module configured to generate a voltage in the HVDC system;
a bypass switch driving unit configured to drive a bypass switch positioned at an input of the sub-module;
a sub-module controller configured to monitor a voltage of a capacitor positioned in the sub-module to transmit the monitored voltage to a system controller and control the sub-module and the bypass switch driving unit according to a command of the system controller; and
a voltage monitoring unit configured to monitor the voltage of the capacitor positioned in the sub-module and control the bypass switch driving unit,
wherein, when the voltage of the capacitor exceeds a bypass switch-on voltage by the sub-module controller positioned between an operating voltage and a capacitor limit voltage, the sub-module controller controls the bypass switch driving unit to perform bypass at the input of the sub-module, and wherein, when the voltage of the capacitor exceeds a bypass switch-on voltage by the voltage monitoring unit positioned between the bypass switch-on voltage by the sub-module controller and the capacitor limit voltage, the voltage monitoring unit controls the bypass switch driving unit to perform bypass at the input of the sub-module.

2. The device of claim 1, wherein the sub-module includes:
the capacitor configured to store and release energy;
an insulated gate bipolar transistor1 (IGBT1) and a first diode which are positioned between a P input of the sub-module and a positive terminal of the capacitor; and
an insulated gate bipolar transistor2 (IGBT2) and a second diode which are positioned between the P input and a negative terminal of the capacitor connected to an N input of the sub-module.

3. The device of claim 2, wherein the sub-module controller controls both the IGBT1 and the IGBT2 to be turned off to allow input energy of the sub-module to be stored in the capacitor through the first diode in a section in which a P input voltage of the sub-module is higher than an N input voltage thereof.

4. The device of claim 2, wherein the sub-module controller controls the IGBT1 to be turned on and controls the IGBT2 to be turned off to allow the energy charged in the capacitor to be released to an input of the sub-module in a section in which a P input voltage of the sub-module is lower than an N input voltage thereof.

5. The device of claim 2, wherein the sub-module controller controls the IGBT1 to be turned off and controls the IGBT2 to be turned on to bypass the P input and the N input of the sub-module.

6. The device of claim 1, wherein the bypass switch is connected between a P input and an N input of the sub-module and bypasses the P input and the N input under control of the bypass switch driving unit.

7. A method of bypassing a sub-module in a high voltage direct current (HVDC) system, the method comprising:
a system controller command receiving operation of receiving, by a sub-module controller, a control command from a system controller;
an energy storage operation of, when the control command indicates energy storage, controlling, by the sub-module controller, an insulated gate bipolar transistor1 (IGBT1) and an insulated gate bipolar transistor2 (IGBT2) of the sub-module to construct a path through which energy is storable in a capacitor in the sub-module;
an energy release operation of, when the control command indicates energy release, controlling, by the sub-module controller, the IGBT1 and the IGBT2 of the sub-module to construct a path through which the energy of the capacitor in the sub-module is releasable;
a bypass operation of, when the control command indicates bypass, controlling, by the sub-module controller, the IGBT1 and the IGBT2 of the sub-module to block a path with the capacitor in the sub-module and construct a bypass path;
a capacitor voltage transmitting operation of, when it is checked whether a voltage of the capacitor in the sub-module is greater than a bypass switch-on voltage by the sub-module controller and the voltage of the capacitor is less than the bypass switch-on voltage by the sub-module controller, transmitting the voltage of the capacitor to the system controller;
a bypass switch driving unit turning-on operation of, when the voltage of the capacitor in the sub-module is greater than the bypass switch-on voltage by the sub-module controller, comparing the voltage of the capacitor in the sub-module with a bypass switch-on voltage by a voltage monitoring unit and, when the voltage of the capacitor is greater than the bypass switch-on voltage by the voltage monitoring unit, turning a bypass switch driving unit on; and
a bypass switch turning-on operation of turning, by the bypass switch driving unit, a bypass switch on,
wherein the bypass switch-on voltage by the voltage monitoring unit is positioned between the bypass switch-on voltage by the sub-module controller and a capacitor limit voltage.

8. The method of claim 7, wherein, in the energy storage operation, the sub-module controller controls both the IGBT1 and the IGBT2 to be turned off to allow input energy of the sub-module to be stored in the capacitor through a first diode in a section in which a P input voltage of the sub-module is higher than an N input voltage thereof.

9. The method of claim 7, wherein, in the energy release operation, the sub-module controller controls the IGBT1 to be turned on and controls the IGBT2 to be turned off to allow the energy charged in the capacitor to be released to an input of the sub-module in a section in which a P input voltage of the sub-module is lower than an N input voltage thereof.

10. The method of claim 7, wherein, in the bypass operation, the sub-module controller controls the IGBT1 to be turned off and controls the IGBT2 to be turned on to bypass a P input and an N input of the sub-module.

* * * * *